United States Patent
Juhasz et al.

(10) Patent No.: US 9,766,361 B2
(45) Date of Patent: Sep. 19, 2017

(54) METHODS AND APPARATUS FOR ELECTROMAGNETIC SURVEYING USING DYNAMICALLY-SELECTED SOURCE WAVEFORMS

(71) Applicant: PGS Geophysical AS, Oslo (NO)

(72) Inventors: Robert Juhasz, Stockholm (SE); Peter Lindqvist, Segeltorp (SE)

(73) Assignee: PGS Geophysical AS, Oslo (NO)

( * ) Notice: Subject to any disclaimer, the term of this patent is extended or adjusted under 35 U.S.C. 154(b) by 383 days.

(21) Appl. No.: 14/511,625

(22) Filed: Oct. 10, 2014

(65) Prior Publication Data

US 2016/0103239 A1    Apr. 14, 2016

(51) Int. Cl.
*G01V 3/00* (2006.01)
*G01V 3/165* (2006.01)
*G01V 3/08* (2006.01)

(52) U.S. Cl.
CPC .............. *G01V 3/165* (2013.01); *G01V 3/083* (2013.01); *G01V 2003/084* (2013.01); *G01V 2003/085* (2013.01)

(58) Field of Classification Search
CPC .. G01V 3/165; G01V 3/083; G01V 2003/084; G01V 2003/085
USPC ......................................... 324/323, 335, 337
See application file for complete search history.

(56) References Cited

U.S. PATENT DOCUMENTS

| | | | |
|---|---|---|---|
| 4,677,438 A | 6/1987 | Michiguchi et al. | |
| 5,703,833 A | 12/1997 | Allen | |
| 6,914,433 B2 | 7/2005 | Wright | |
| 7,671,598 B2 | 3/2010 | Ronaess et al. | |
| 8,386,182 B2 | 2/2013 | Hornbostel | |
| 2006/0129322 A1 | 6/2006 | McGregor et al. | |
| 2006/0238200 A1 | 10/2006 | Johnstad | |
| 2009/0243613 A1 | 10/2009 | Lu et al. | |
| 2009/0262601 A1 | 10/2009 | Hillesund et al. | |
| 2009/0284265 A1* | 11/2009 | Ohta .................... | H02H 1/0015 324/536 |
| 2011/0087435 A1 | 4/2011 | Hornbostel | |
| 2011/0164470 A1 | 7/2011 | Wei | |
| 2013/0221969 A1* | 8/2013 | Kennedy ................ | G01V 3/083 324/337 |

OTHER PUBLICATIONS

Rune Mittet, et al. "Shaping optimal transmitter waveforms for marine CSEM surveys", Geophysics, vol. 73, vol. 3, May 1, 2008, pp. F97-F104, XP001512278.

The International Search Report and Written Opinion of the International Searching Authority for Application No. PCT/EP2015/073250 mailed, Feb. 16, 2016 [Feb. 16, 2016], 12 sheets.

(Continued)

*Primary Examiner* — Farhana Hoque

(57) ABSTRACT

Disclosed are methods and apparatus for electromagnetic surveying using dynamically-selected source waveforms. In accordance with an embodiment of the invention, a source waveform is adapted by dynamically selecting a source waveform from the set of pre-calculated waveform sequences. The dynamic selection of the source waveform may depend on a measured background noise level. Other embodiments, aspects, and features are also disclosed.

17 Claims, 6 Drawing Sheets

(56) References Cited

OTHER PUBLICATIONS

Chris Anderson et al. "An integrated approach to marine electromagnetic surveying using a towed streamer and source", May 2010, pp. 71-75, EAGE first break, vol. 28.

Johan Mattsson et al. "Error analysis and capability modelling for towed streamer electronnagnetics", Aug. 2012, pp. 91-96, EAGE first break, vol. 30.

Johan Mattsson et al. "Towed streamer EM: the challenges of sensitivity and anisotropy", Jun. 2013, pp. 155-159, EAGE first break, vol. 31.

D. Myer, S. Constable and K. Key "Broad-band waveforms and robust processing for marine CSEM surveys", 2010 The Authors, Geophysical Journal International, pp. 1-10.

R. Mittet and T. Schaug-Pettersen "Shaping optimal transmitter waveforms for marine CSEM surveys", May-Jun. 2008, pp. F97-F104, Geophysics, vol. 73, No. 3.

J. Brady, M.P. Pereira Buonora, C. Campbell, L. Combee, A. Ferster, T. Labruzzo, E. Nichols, S. Patmore and J. Stilling "Electromagnetic Sounding for Hydrocarbons", Oilfield Review Spring 2009, pp. 4-19.

2014 Meritorius Awards for Engineering Innovation, Staff Report, May 1, 2014, pp. 1-12.

\* cited by examiner

METHODS AND APPARATUS FOR ELECTROMAGNETIC SURVEYING USING DYNAMICALLY-SELECTED SOURCE WAVEFORMS

BACKGROUND

Electromagnetic surveying involves imparting an electric field or a magnetic field into subsurface Earth formations, such formations being below a body of water such as a sea, river, lake, or ocean in marine electromagnetic surveys, and measuring electric field amplitude and/or amplitude of magnetic fields by measuring voltage differences induced in electrodes, antennas and/or interrogating magnetometers disposed at the Earth's surface, or on or above the floor of the body of water. The electric and/or magnetic fields are induced in response to the electric field and/or magnetic field imparted into the Earth's subsurface, and inferences about the spatial distribution of conductivity of the Earth's subsurface are made from recordings of the induced electric and/or magnetic fields.

Electromagnetic surveying may also involve imparting a time-varying electromagnetic field into the subsurface formations by passing time-varying electric current through a transmitter antenna. The alternating current may have one or more selected discrete frequencies. Such electromagnetic surveying is known as frequency-domain controlled-source electromagnetic (f-CSEM) surveying. Another technique is known as transient controlled-source electromagnetic (t-CSEM) surveying. In t-CSEM, electric current is passed through a transmitter at the Earth's surface (or near the floor of a body of water), in a manner similar to f-CSEM. The electric current may be direct current (DC). At a selected time, the electric current is switched off, switched on, or has its polarity changed, and induced voltages and/or magnetic fields are measured, typically with respect to time over a selected time interval, at the Earth's surface or water surface. Alternative switching techniques are possible.

The above methods for f-CSEM and t-CSEM have been adapted for use in marine environments. Cable-based electromagnetic sensors have been devised for detecting electric and/or magnetic field signals resulting from imparting electric and/or magnetic fields into formations below the bottom of a body of water. Systems with towed electromagnetic receivers have also been devised.

Note that the figures provided herewith are not necessarily to scale. They are provided for purposes of illustration to ease in the understanding of the presently-disclosed invention.

DETAILED DESCRIPTION

The present disclosure provides an innovative adaptive source electromagnetic surveying technique which uses a source waveform that is selected dynamically from a library of pre-calculated waveforms sequences. The dynamic selections that are made may depend on a receiver signal, which is obtained by using one or more electromagnetic sensors, and/or an auxiliary signal, which is obtained by using one or more auxiliary sensors.

Exemplary Electromagnetic Surveying Apparatus

Figure 1:
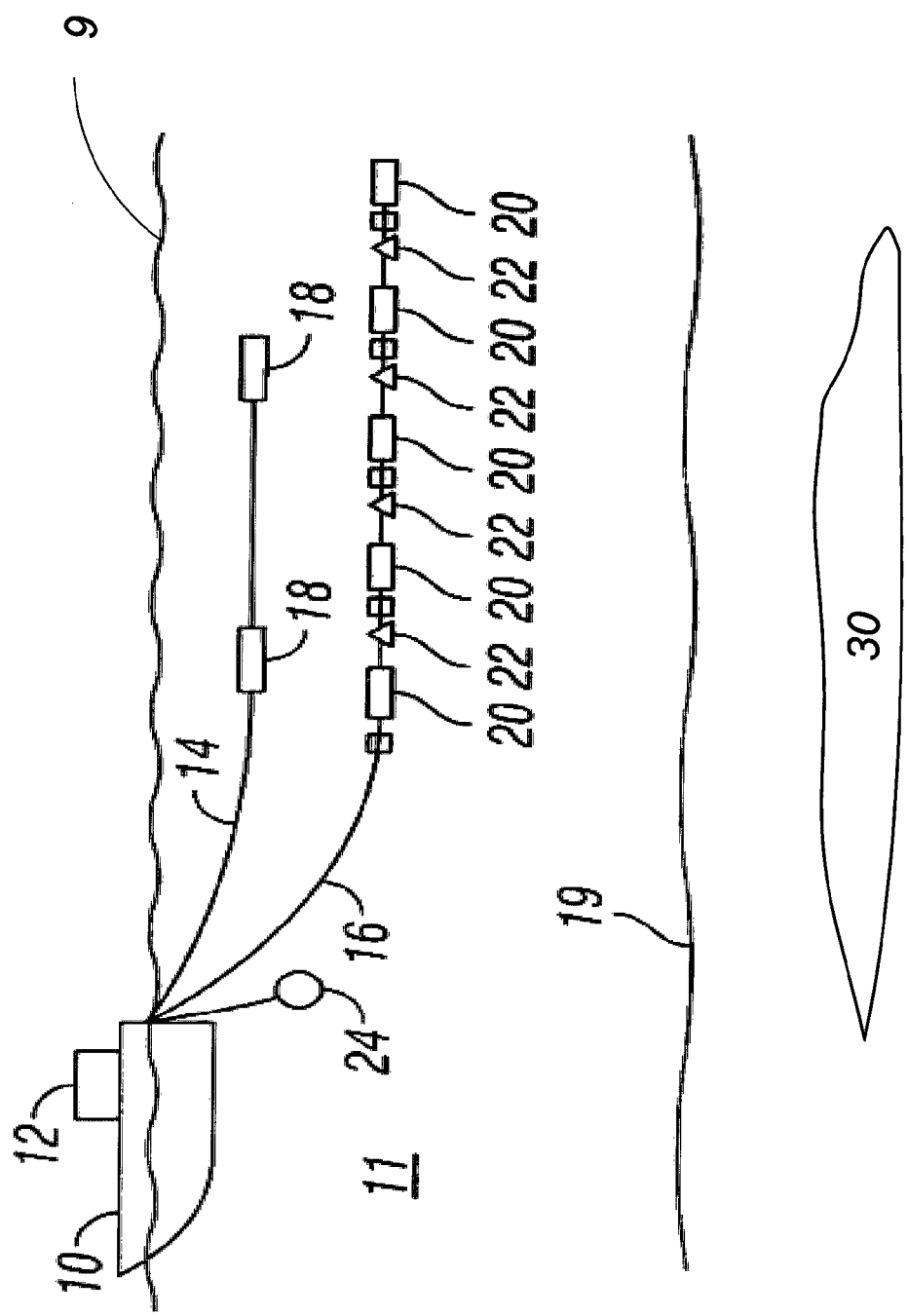
FIG. 1 depicts exemplary marine electromagnetic surveying apparatus which may be used for electromagnetic surveying in accordance with an embodiment of the invention.

FIG. 1 depicts marine electromagnetic surveying apparatus which may be used for electromagnetic surveying in accordance with an embodiment of the invention. As shown, a vessel 10 may move along the surface 9 of a body of water 11, such as a sea, river, lake, or ocean. The vessel 10 may include equipment which may be referred to as a recording system 12. The recording system 12 may include devices for applying electric current to an antenna or antennas, such as source electrodes 18 and/or other devices disposed on or along a source cable 14 towed by the vessel 10. The recording system 12 may also include navigation equipment for navigating the vessel 10, positioning equipment for determining the geodetic position of the vessel 10 and of components towed by the vessel 10 in the body of water 11, and a signal recording device for recording data such as signals detected by one or more sensors (e.g., electromagnetic or seismic) on a sensor cable 16. As shown, the sensor cable 16 may also be towed by the vessel 10. Alternatively, sensor cable 16 may be towed by another vessel (not shown), or the sensors may be configured on ocean bottom cables or nodes. In some embodiments, electromagnetic sensors may be disposed on one or more of sensor cable 16 towed by vessel 10, a sensor cable towed by another vessel, ocean bottom cables, and ocean bottom nodes.

The source cable 14 in the present example may include an antenna consisting of multiple (two are shown in the illustrated example) source electrodes 18 disposed at spaced apart positions along the source cable 14. At selected times, certain components of the equipment in the recording system 12 may conduct electric current across the source electrodes 18. The time varying component of such electric current produces an electromagnetic field that propagates through the body of water 11 and into the subsurface formations below the water bottom 19. The subsurface formations below the water bottom 19 may include, for example, a resistive anomaly region 30 whose characteristics may be the target of the electromagnetic surveying.

The arrangement of the source electrodes 18 shown in FIG. 1, referred to as an in-line horizontal electric dipole antenna, is not the only type of electromagnetic antenna that may be used with the invention. The source cable 14 may also include, in addition to, or in substitution of, the in-line horizontal electric dipole antenna shown in the figure, any one or more of a cross-line electric dipole antenna, a vertical electric dipole antenna, and horizontal or vertical magnetic dipole antenna (current loop), or similar devices with other orientations with respect to the towing direction.

In the illustrated example, the vessel 10 may also tow at least one sensor cable 16. The sensor cable 16 may include a plurality of electromagnetic sensors 20 at spaced apart positions along the sensor cable 16. Each of the electromagnetic sensors 20 may measure a parameter related to the electromagnetic field resulting from interaction of the electromagnetic field imparted by the antenna (e.g., source electrodes 18) into the subsurface formations below the water bottom 19. In the present example, the electromagnetic sensors may be a pair of receiver electrodes disposed at spaced apart positions along the sensor cable 16. An electric field component of the electromagnetic field resulting from interaction of the imparted electromagnetic field with the subsurface formations below the water bottom 19 may induce voltages across each of the pairs of receiver electrodes, and such voltages may be detected by a voltage measuring circuit. Such voltage measuring circuits may be disposed in the sensor cable 16 and/or in the recording system 12. Another example of an electromagnetic sensor that may be used is a single axis or multi-axis magnetometer, such as a flux gate magnetometer.

The sensor cable 16 in some examples may also include seismic sensors, such as hydrophones and/or geophones, shown generally at 22, disposed at spaced apart locations along the sensor cable 16. In some embodiments, seismic energy sensors may be disposed on one or more of sensor cable 16 towed by vessel 10, a sensor cable towed by another vessel, ocean bottom cables, and ocean bottom nodes. For such examples where the marine electromagnetic surveying apparatus includes seismic sensors, the vessel 10 or another vessel may tow a seismic energy source 24, such as an air gun, marine vibrator, or array of air guns or marine vibrators. The seismic energy source 24 may be actuated at selected times by certain equipment in the recording system 12 and signals detected by the seismic sensors 22 may be recorded by a signal recording device in the recording system 12. During electromagnetic survey operations, seismic signals may be acquired substantially contemporaneously with electromagnetic signals detected by the electromagnetic sensor 20 or may be acquired at other times.

It should be understood that the example in the figure including only one sensor cable 16 is shown to illustrate how to make and use a sensor cable according to various aspects of the invention. Such a sensor cable may be used in acquisition systems that include a plurality of laterally spaced apart sensors cables towed by the vessel 10, and/or by another vessel, in a selected configuration to provide "in line" and "cross line" electromagnetic and/or seismic signals.

Exemplary Method

Figure 2:
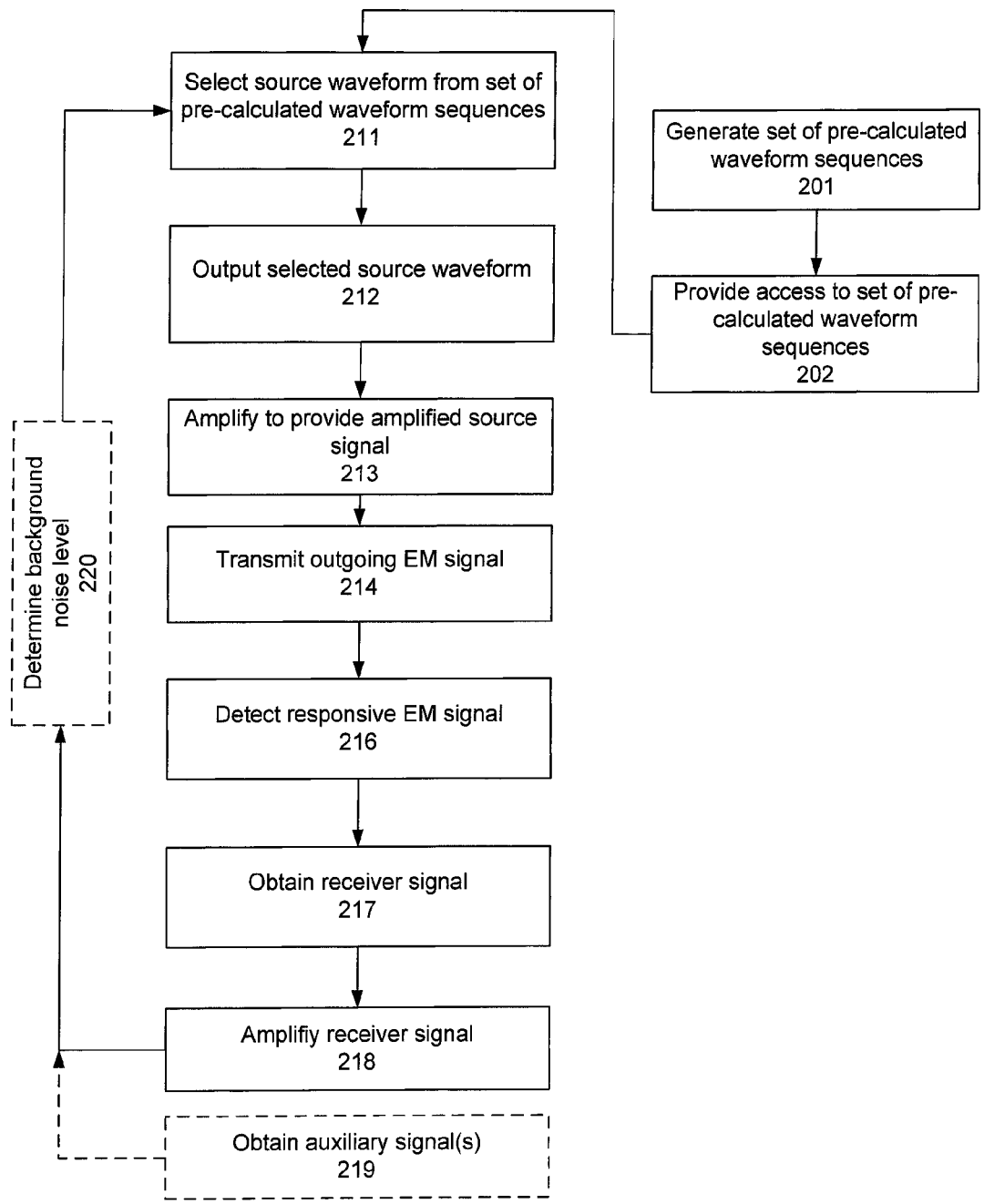
FIG. 2 is a flow chart showing an exemplary method for electromagnetic surveying using source waveforms that are dynamically selected from a library of pre-calculated waveform sequences in accordance with an embodiment of the invention.

FIG. 2 is a flow chart showing an exemplary method 200 for electromagnetic surveying using source waveforms that are dynamically selected from a library of pre-calculated waveform sequences in accordance with an embodiment of the invention. The method 200 of FIG. 2 includes two preliminary steps (201 and 202) and various steps (211 through 220) that may be performed during the electromagnetic survey. In some embodiments, the preliminary steps (201 and 202) may be performed remote in time and/or space from the other steps of exemplary method 200 for electromagnetic surveying.

Per step 201, a set (e.g., a library or a database) of pre-calculated waveform sequences is generated. An exemplary implementation for generating the set of pre-calculated waveform sequences uses a scoring procedure described below in relation to FIGS. 4 and 5. While the exemplary implementation provides one procedure for generating the set of pre-calculated waveform sequences, other procedures for obtaining the set of pre-calculated waveform sequences may be utilized in other implementations.

Access to the set of pre-calculated waveform sequences may then be provided per step 202. For example, the set of pre-calculated waveform sequences may be stored in non-volatile data storage.

During the electromagnetic survey, the method 200 selects a source waveform from the set of pre-calculated waveform sequences per step 211. The selection depends on a receiver signal obtained in step 217, and, optionally, on one or more auxiliary signals obtained in step 219. In an embodiment of the invention, the selection may use a background noise level determined in step 220.

An exemplary procedure for selecting the source waveform per step 211 may compute and/or use scores for different pre-calculated waveform sequences in the library in relation to the receiver signal (and optionally auxiliary signal(s)), background noise levels, geophysical constraints, signal-to-noise ratio requirements, and so on. In one implementation, the computed score may be a signal-to-noise ratio in a frequency band and may also depend on a number of peaks in a frequency band, the levels of auxiliary sensors in different frequency bands, or a combination thereof. An exemplary scoring procedure is described below in relation to FIGS. 4 and 5. A particular source waveform with a superior score may be selected from the set of pre-calculated waveform sequences. An exemplary case where selection of the source waveform changes depending on the background noise level is described below in relation to FIG. 6.

Once the source waveform is selected from the set of pre-calculated waveform sequences, the source waveform may be output per step 212. The method 200 may then proceed to step 213 in which the source waveform may be amplified, if necessary, using a transmitter amplifier circuit to provide an amplified source waveform.

Per step 214, an outgoing electromagnetic signal may be transmitted. The transmission may be accomplished using an antenna that is driven by the amplified source waveform. The outgoing electromagnetic signal may be transmitted underwater such that it interacts with a target subsurface formations.

Per step 216, a responsive electromagnetic signal may be received by one or more electromagnetic sensors. The responsive electromagnetic signal may depend upon, and may provide information regarding, the structural and material characteristics of the body of water and the subsurface formation. Per step 217, a pre-amplified receiver signal may be obtained from the electromagnetic sensors. Per step 218, the pre-amplified receiver signal may be amplified using a receiver amplifier circuit to provide a receiver signal. This amplification step 218 is optional and may not be necessary if the pre-amplifier has sufficiently high gain.

Per step 219, which is optional, the auxiliary signal may be obtained by measurement over a prescribed time period. In one implementation, the prescribed time period may correspond to a line of an electromagnetic survey. In another implementation, the prescribed time period may correspond to a shot from a source generator, or part of a shot, depending on the speed of feedback desired. Per step 220, which is also optional, the background noise level may be determined from the receiver signal and/or the auxiliary signal.

Thereafter, as shown in the figure, the method 200 may loop back to step 211 to repeat performance of the above-discussed steps (i.e. steps 211, 212, 213, 214, 216, 217, and 218, and, optionally, 219 and 220). In this way, the electromagnetic surveying may be performed using an adaptive source that is dynamically selected from a set of pre-calculated waveform sequences. In one embodiment, the steps may be repeated throughout a electromagnetic survey of a target region so that the source waveform is continuously adapted by dynamic selection. In another embodiment, step 211 may be applied periodically so that the source waveform is periodically adapted by dynamic selection.

Exemplary System

Figure 3:
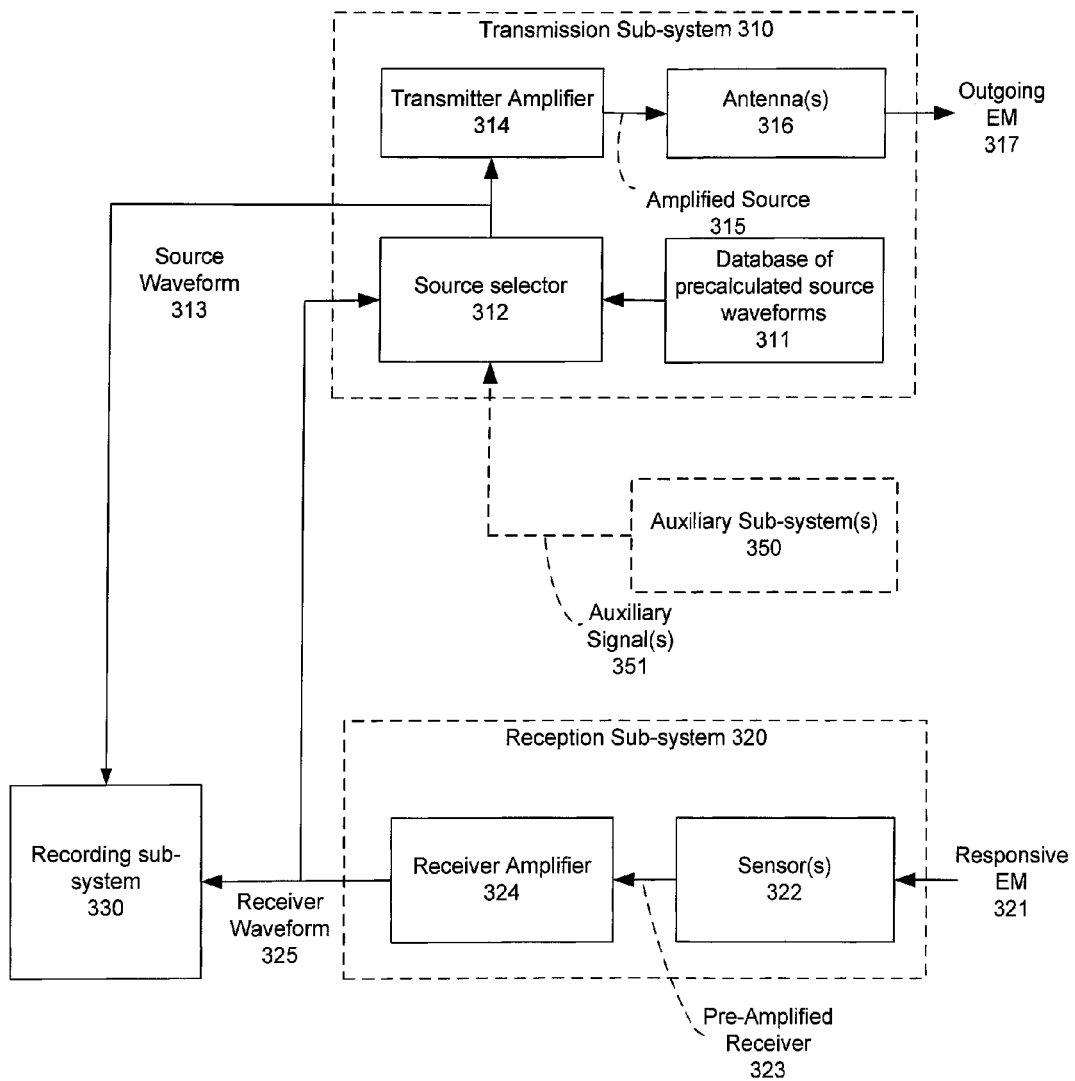
FIG. 3 is a block diagram depicting select components of an exemplary system for electromagnetic surveying using source waveforms that are dynamically selected from a library of pre-calculated waveform sequences in accordance with an embodiment of the invention.

FIG. 3 is a block diagram depicting select components of an exemplary system 300 for electromagnetic surveying using source waveforms that are dynamically selected from a library of pre-calculated waveform sequences in accordance with an embodiment of the invention. As shown, the system 300 may include a transmission subsystem (e.g., transmitter) 310, a reception subsystem (e.g., receiver) 320, a recording subsystem (e.g., recorder) 330, and one or more auxiliary subsystems 350. At least some of the various components of the system 300 may be on, or towed by, a vessel traveling over a target subsurface formation in a body of water. In some embodiments, some of the various components of the system 300 may be on a separate vessel, secured at or near the water bottom, or onshore.

The transmission subsystem 310 may include a database of pre-calculated waveform sequences 311, a source selector 312, a transmitter amplifier 314, and an antenna 316 (for example, the source electrodes 18 in FIG. 1). The database 311 includes a set of pre-calculated waveform sequences. This set of pre-calculated waveform sequences may be generated, for example, utilizing the scoring technique described herein. The source selector 312 may use various data inputs to select one source waveform 313 from the database 311. The selected source waveform 313 may be, for example, a broadband signal that includes one or more frequency peaks.

The transmitter amplifier 314 may be a circuit arranged to amplify the selected source waveform 313 to provide an amplified source waveform 315. The antenna 316 may be arranged to be driven by the amplified source waveform 315 so as to transmit an outgoing electromagnetic signal 317. The outgoing electromagnetic signal may be transmitted underwater such that it interacts with a target subsurface formation.

The reception subsystem 320 may include one or more electromagnetic sensors 322 (for example, the electromagnetic sensors 20 in FIG. 1) and a receiver amplifier 324. A responsive electromagnetic signal 321 may be detected by one or more electromagnetic sensors 322. The responsive electromagnetic signal 321 depends upon, and provides information regarding, the structural and material characteristics of the body of water and the subsurface formation. A pre-amplified receiver signal 323 may be output by the electromagnetic sensor(s) 322 and may be amplified using the receiver amplifier circuit 324 to provide a receiver signal 325. The receiver signal 325 may be output to the recording subsystem 330 and the source selector 312 of the transmission subsystem 310.

The recorder subsystem 330 may be arranged to record the receiver signal 325 from the receiver subsystem 320. In accordance with an embodiment of the invention, the recorder subsystem 330 may be further arranged to also record the source waveform 313 which adaptively changes over time in a dynamic manner during the electromagnetic survey. The recorder subsystem 330, or a separate data processing subsystem, may be configured to process at least the receiver signal 325 so as to extract useful information about the subsurface structure of the region being surveyed.

The source selector 312 of the transmission subsystem 310 may be arranged to receive at least the receiver signal 325. In certain embodiments of the invention, the source selector 312 may also receive one or more auxiliary signals 351 obtained from one or more auxiliary subsystems 350. For example, auxiliary signals 351 may be obtained from seismic sensors (e.g., geophones or hydrophones) which may be towed by the same vessel. As further examples, the auxiliary signals 351 may be obtained from other sensors, such as accelerometers and magnetometers in the electromagnetic streamer measuring its movement. Additionally, in embodiments with multiple sources, the feedback control signal for one source may depend on auxiliary signals obtained from the source generator associated with another source. As disclosed herein, the source selector 312 may utilize the receiver signal 325 and/or the auxiliary signal(s) 351 so as to make an appropriate selection of the source waveform 313 from the database 311.

Exemplary Scoring Procedure

The following describes an exemplary scoring procedure that may be used in generating the set of pre-calculated waveform sequences per step 201 and selecting the source waveform from the set per step 211.

To improve the results from a electromagnetic survey, it is desirable to use a source waveform that contains all the important frequencies with adequate amplitude and signal-to-noise ratio. Hence, it is desirable that the frequency dependence of the electric current amplitude approximately follows the frequency dependence of the electric field background and noise.

Designing source waveforms is a non-trivial problem. There is no simple relation between the switching of the electric current in the source output electronics and the amplitudes of each frequency. Hence, conventionally, designing source sequences is basically a trial and error search problem. Source waveforms are generated and tested against the amplitude criteria set up.

However, the number of possible combinations to test by trial-and-error becomes quickly too large with the number of possible switches. Hence, in previous works, the number of frequencies to optimize for has been limited, usually to three to four frequencies. In such a case, a least mean square sum from obtained and desired source waveform amplitudes will be adequate.

In accordance with an embodiment of the invention, the number of frequencies to optimize may be many more than three or four frequencies. For example, in one implementation, up to twenty frequencies may be optimized. With this many frequencies, while a single frequency may deviate considerably from the desired amplitude, the other frequencies may compensate in a least-mean-square computation.

In addition, conventional techniques do not necessarily distinguish between amplitudes smaller or larger than the desired amplitudes. It is desirable to make such a distinction since the desired frequency distribution may be non-existent or impossible to find, and higher amplitudes are generally better. The technique disclosed herein advantageously provides for the use of a suitable frequency band with a sufficiently dense grid of frequencies. Such a frequency band with a sufficiently dense grid of frequencies is advantageous in the inversion of EM data provided that the signal-to-noise ratio is high enough.

A flexible scoring technique that is sensitive to the relatively smallest frequency amplitude is disclosed herein. The scoring technique may be used for any number of frequencies with a controllable sensitivity. The scoring technique may be used here to populate a database of pre-calculated waveform sequences with various amplitude distributions with many (for example, ten to twenty) frequencies to optimize for.

For explanatory purposes, the following discussion of the scoring technique assumes an ideal source waveform in that the source waveform can only be in the "current on" states $+I_0$ and $-I_0$ with no dead times in the switching and zero current rise time. Alternatively, it is possible for an ideal source waveform to have "current off" states but that will reduce the sent out power.

The base source waveform time series may be considered to be an integer number of current states of equal time length $\delta t$. So $I(t_k)=I_0 F(t_k)$ with $F(t_k)=-1$, 0 or 1, where k=1 to M with M even, and $t_{k+1}=t_k+\delta t$. The available frequencies of such a time series is limited to $f_n=nf_0$, where $f_0$ is the inverse of the base source waveform time length $T=M\delta t$, and n is an integer. The amplitude $a_n$ for each frequency is obtain by Fourier series expansion. In addition, the current DC component may be required to be zero.

To compare different source waveform, there must be a definition of how to calculate a score result for a source waveform. An exemplary implementation of the scoring process is now described. Let $$Q_{score} = \left(N_{f-score} \bigg/ \sum_{used\,n} \left(\frac{1}{r_n + \delta}\right)^p\right)^{1/p} \quad (1)$$

where p>0, $\delta=10^{-20}$, or smaller, and the relative amplitude $r_n=a_n/b_n$ and $b_n$ is a preferred $a_n$ level. If possible, the preferred amplitude $b_n$ may be selected so $r_n \leq 1$, but this is not critical. The $N_{f-score}$ the number of frequencies used in the score calculation. The $Q_{score}$ parameter is intended to be insensitive to $a_n > b_n$. The $\delta$ parameter (delta parameter) ensures a finite result, but can be set to zero if the calculations can handle infinite values.

Source waveform are sorted by searching for the highest $Q_{score}$. Define a vector with $r_n$ values for frequencies to optimize on as $$r=[r_{n1} r_{n2} r_{n3} \ldots r_{N_{f-score}}] \quad (2)$$

Define a deviation fraction as $\epsilon_{score}$ with $\gamma=(1-\epsilon_{score})$ and $0<\epsilon_{score}<1$. Now, require that the ratio vectors $$^1r=[\gamma^2 1 1 \ldots 1] \quad (3)$$

and $$^2r=\gamma[1 1 1 \ldots 1] \quad (4)$$

get equal scores independently of $N_{f-score}$ and $\epsilon_{score}$. This condition guarantees that the lowest $r_n$ controls the score to a high degree. In one implementation, we allow $N_{f-score}$ to vary in the range $3 \leq N_{f-score} \leq 20$.

A value for p can be obtained for each combination of $N_{f-score}$ and $\epsilon_{score}$ as $$p = -\frac{\ln(N_{f-score}-1)}{\ln(1-\varepsilon)}$$

(5) The required exponent p increases with decreasing $\epsilon_{score}$ and increasing $N_{f-score}$. This variable p allows for a more normalized scoring of source waveforms per Eq. (1) than what a single fixed p would produce.

The scoring process described above is an improvement over a least-mean-square-based scoring when the number of involved frequencies is about ten or more. It also works when the number of involved frequencies is a few as three. In accordance with an embodiment of the invention, the scoring process described above may be advantageously used as the selection tool in the creation of a database of pre-calculated waveform sequences for a variety of noise characteristics and number of frequencies.

Figure 4:
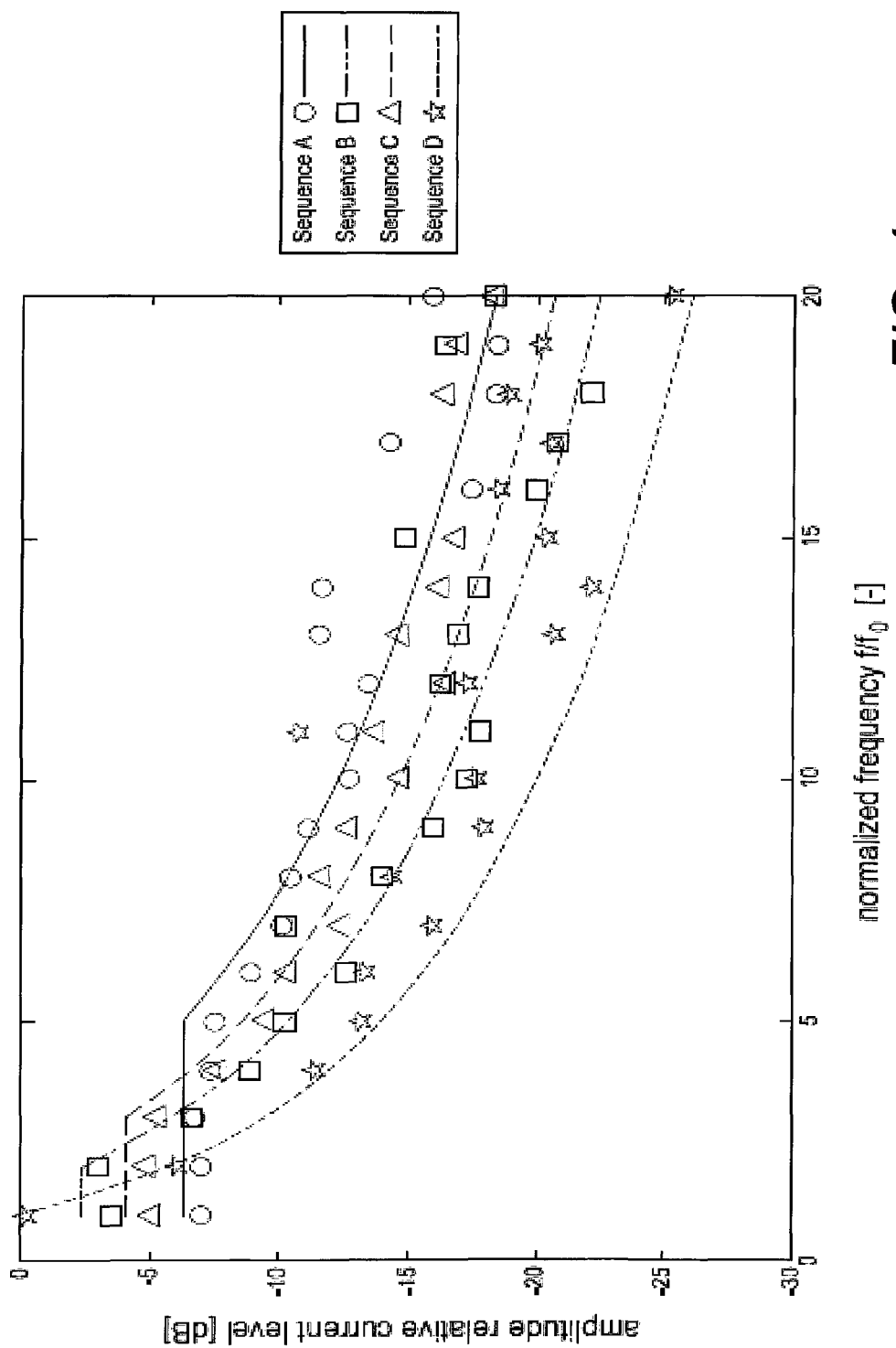
FIG. 4 is a graph of amplitudes and frequencies of several example source waveforms in accordance with an embodiment of the invention.

In FIG. 4, the relative amplitudes and normalized frequencies of four example source waveforms (waveforms A, B, C and D) are shown. Each example source waveform is optimized on the first twenty frequencies.

For each example source waveform, a line indicates the relative amplitude as a function of normalized frequency that was used in the search. The associated reference marks indicate the twenty discrete normalized frequencies and their corresponding relative amplitudes used for each example source waveform.

As seen in FIG. 4, each source waveform may include a collection of discrete frequency peaks, rather than a continuous band of frequencies. In an exemplary implementation, there is a trade-off such that a denser set of peaks in a frequency band may be offset by a lower amplitude for those peaks. In other words, a first source waveform may have a larger number of peaks (greater density) in a given frequency band than a second source waveform. In that case, in order to compensate for the greater density of peaks, the amplitudes of the peaks in the first source waveform may be smaller than the amplitudes of the peaks in the second source waveform.

Furthermore, the distribution of the amplitudes of the discrete frequency peaks may differ. Some source waveform may have peaks with similar amplitudes. Other source waveform may have peaks with amplitudes that decrease with increasing frequency f. For example, the amplitudes may be proportional to 1/f. These particularities of the different source waveforms in the library may all be scored in the selection process to match geophysical constraints, requirements for signal-to-noise ratio, and so on.

Figure 5:
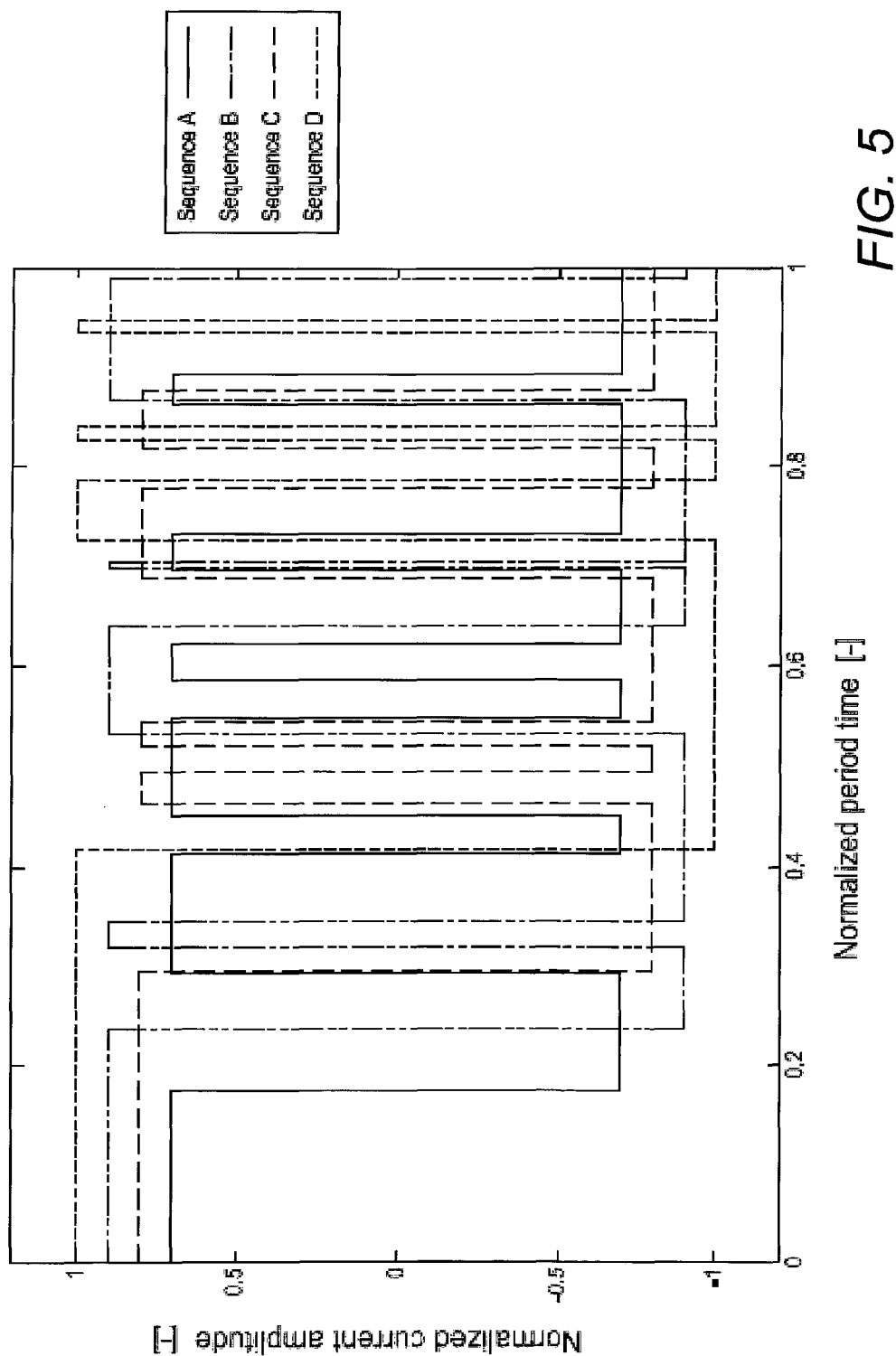
FIG. 5 shows a current time series for one period for each of the example source waveforms of FIG. 4 in accordance with an embodiment of the invention.

A deviation fraction $\epsilon_{score}=0.05$ has been used resulting in an exponent of $p \approx 57.4$ for $N_{f-score}=20$. The number of time segments and switches in each source waveform may be in the range from 150 to 180 and from 8 to 12, respectively. In general, the number of switches increases with how flat the spectrum is as switches move energy to higher frequencies. The time series for one period for each of example source waveforms A, B, C, and D is shown in FIG. 5. In FIG. 5, the amplitudes are scaled for visibility.

Selection Depending on Background Noise

In accordance with an embodiment of the invention, the selection of the source waveform may adjust the frequency content of the source depending upon the background noise level. The background noise level may be measured in the receiver signal from periods before, after, or during a line of a marine seismic survey. Alternatively, the background noise level may be estimated from an auxiliary signal(s).

In accordance with an embodiment of the invention, the source waveform may be scored or selected by a set of rules that, for example, require the signal-to-noise ratio to be in a certain range at a key set of frequencies or frequency bands. Larger background noise will require the energy to be concentrated to fewer frequencies, and, thus, a source waveform with that frequency content may be selected. Whereas, if the background noise level is lower, then a source waveform with more frequency peaks may be selected to provide increased density of the frequency coverage.

Figure 6:
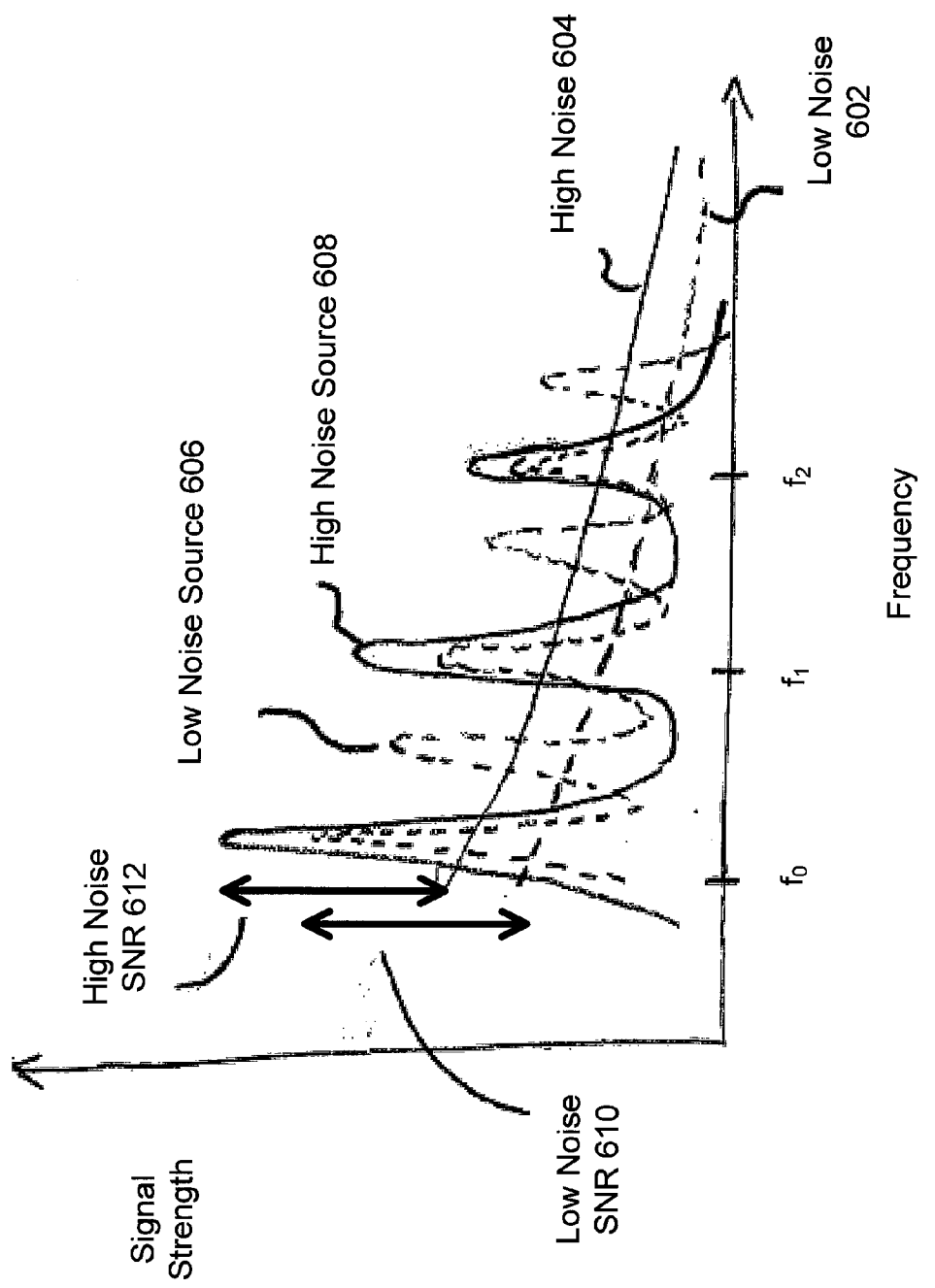
FIG. 6 illustrates an exemplary selection of a source waveform depending on a background noise level in accordance with an embodiment of the invention.

FIG. 6 illustrates an exemplary selection of a source waveform depending on a background noise level in accordance with an embodiment of the invention. Two example background noise levels and three key frequencies ($f_0$, $f_1$ and $f_2$) are depicted in FIG. 6. The first is a relatively lower noise, level (Low Noise) 602, and the second is a relatively higher noise level (High Noise) 604.

In accordance with an embodiment of the present invention, if the background noise level is determined 220 to be the lower noise level 602, then the source selector 312 may select 211 a first source waveform (e.g., Low Noise Source) 606 that has frequency peaks with smaller peak amplitudes in the pertinent frequency band. This results, for example, in a first signal-to-noise ratio (e.g., Low Noise Signal-to-Noise Ratio) 610 at frequency $f_0$ (the lowest key frequency) that is shown in an illustrative manner in FIG. 6. Similar signal-to-noise ratios result at the other key frequencies.

On the other hand, if the background noise level is determined 220 to be the higher noise level 604, then the source selector 312 may select 211 a second source waveform (e.g., High Noise Source) 608 that has frequency peaks of larger peak amplitudes in the pertinent frequency band. This results, for example, in a second signal-to-noise ratio (e.g., High Noise signal-to-noise ratio) 612 at frequency that is shown in an illustrative manner in FIG. 6. Similar signal-to-noise ratios result at the other key frequencies.

Note that the High Noise Source 608 and the Low Noise Source 606 may have the same or approximately the same total energy. In this case, as illustrated, the High Noise Source 608 with higher peak amplitudes has fewer (for example, only three) and more sparsely distributed peaks while the Low Noise Source 606 with lower peak amplitudes has a greater number (for example, six) of more densely distributed peaks.

Note that, in accordance with an embodiment of the invention, the signal-to-noise ratio may be kept approximately the same (i.e. within a same range) by the technique described above. This allows for denser frequency coverage in a lower noise situation, while sparser frequency coverage is used in a higher noise situation.

Conclusion

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for electromagnetic surveying of a subsurface formation, the method comprising:
    performing a scoring process that calculates score results for waveform sequences and sorts the waveform sequences by score result to select a plurality of waveform sequences with various amplitude distributions with a plurality of frequencies;
    populating a database with the plurality of waveform sequences;
    transmitting an outgoing electromagnetic signal which is based on a source waveform;
    detecting, using at least one electromagnetic sensor, a responsive electromagnetic signal;
    obtaining a receiver signal which is based on the responsive electromagnetic signal; and
    dynamically selecting the source waveform from the database of waveform sequences, wherein the selecting is performed by a source selector using the receiver signal as a feedback control signal.

2. The method of claim 1, wherein the dynamic selection of the source waveform further uses an auxiliary signal obtained from an auxiliary sensor.

3. The method of claim 1, further comprising:
    amplifying the source waveform to provide an amplified source waveform; and
    using the amplified source waveform to drive the outgoing electromagnetic signal.

4. The method of claim 1, further comprising:
    obtaining a pre-amplified receiver signal from the at least one electromagnetic sensor; and
    amplifying the pre-amplified receiver signal to obtain the receiver signal.

5. The method of claim 1, further comprising:
    repeating the transmitting, detecting, obtaining, and dynamically selecting steps during an electromagnetic survey of the subsurface formation.

6. The method of claim 1, wherein the subsurface formation is below a body of water, the outgoing electromagnetic signal is transmitted with an antenna, and wherein the antenna is towed in the body of water during the electromagnetic survey of the subsurface formation.

7. The method of claim 6, wherein the at least one electromagnetic sensor is towed in the body of water during the electromagnetic survey of the subsurface formation.

8. The method of claim 1, wherein the plurality of waveform sequences includes waveform signals with a plurality of frequency peaks in a frequency band.

9. The method of claim 8, wherein the plurality of frequency peaks in the frequency band have amplitudes that are inversely proportional to their frequencies.

10. The method of claim 8, wherein a source waveform with peaks in a higher-frequency band is selected if a frequency shift of the Earth's frequency response signal is positive, and wherein a source waveform with peaks in a lower-frequency band is selected if the frequency shift of the Earth's frequency response signal is negative.

11. The method of claim 1 further comprising:
    measuring a background noise level,
    wherein the dynamic selection of the source waveform depends on the background noise level in a frequency band.

12. The method of claim 11, wherein the dynamic selection selects a source waveform with a smaller number of frequency peaks in the frequency band when the background noise level is high, and the dynamic selection selects a different source waveform with a larger number of frequency peaks in the frequency band when the background noise level is low.

13. An apparatus for electromagnetic surveying of a subsurface formation, the apparatus comprising:

a receiver for detecting a responsive electromagnetic signal so as to obtain a receiver signal;

a source adaptor for adapting a source waveform using at least the receiver signal;

an antenna for transmitting an outgoing electromagnetic signal which is an amplified version of the source waveform;

a recording system with data storage that performs a scoring process that calculates score results for waveform sequences, sorts the waveform sequences by score result to select a set of pre-calculated waveform sequences with various amplitude distributions with a plurality of frequencies, and populates a database with the set of pre-calculated waveform sequences; and a source selector for dynamically selecting a source waveform from the set of pre-calculated waveform sequences using the receiver signal and an auxiliary signal as feedback control signals.

14. The apparatus of claim 13, wherein the source waveform comprises a plurality of frequency peaks in a frequency band.

15. The apparatus of claim 14, wherein the plurality of frequency peaks in the frequency band have amplitudes that are inversely proportional to their frequencies.

16. The apparatus of claim 13, wherein dynamically selecting the source waveform depends on a background noise level in a frequency band.

17. The apparatus of claim 16, wherein a source waveform with larger peak amplitudes in the frequency band is dynamically selected when the background noise level is high, and a different source waveform with smaller peak amplitudes in the frequency band is dynamically selected when the background noise level is low.

* * * * *